ABSTRACT OF THE DISCLOSURE

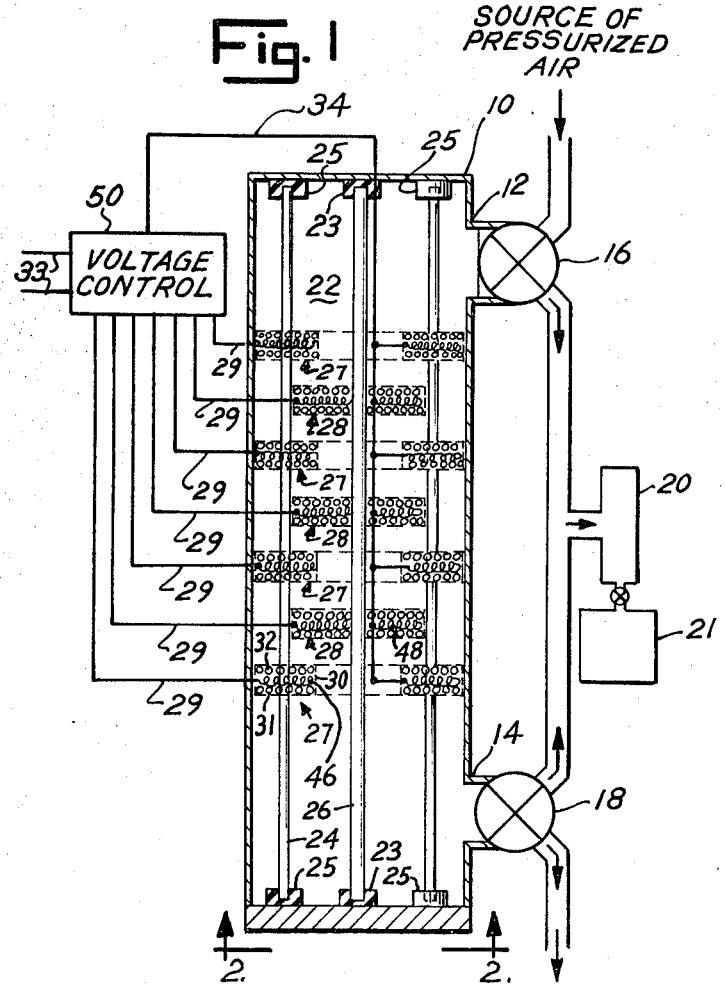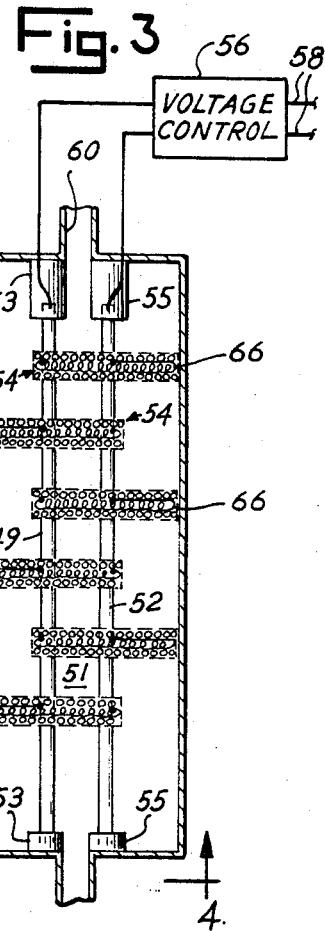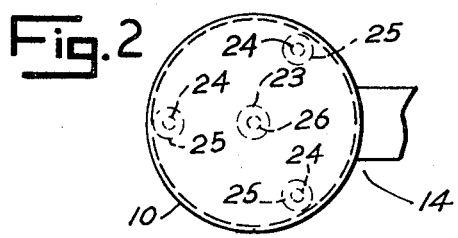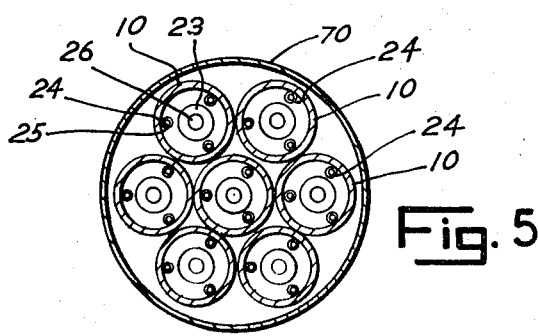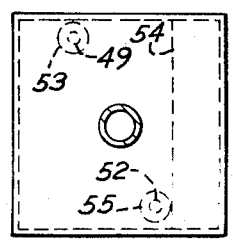
INVENTOR.
GEORGE H. BANCROFT
ATTORNEYS 3,687,634
APPARATUS FOR PREPARING OXYGEN
FROM AIR
George H. Bancroft, Kansas City, Mo., assignor to
The Bendix Corporation
Filed Aug. 20, 1970, Ser. No. 65,554
Int. Cl. B01j 7/00; C01b 13/02
U.S. Cl. 23—281                                        9 Claims

An apparatus for extracting oxygen from air which includes a housing having a plurality of containers located on a plurality of support members. The containers are staggered with respect to each other and each contains a heating element and is filled with crystals of barium oxide which are retained therein by screens located at the top and bottom of the container. When the temperature of the barium oxide is raised to 1200°–1400° F., pressurized air reacts with the granular barium oxide to form barium peroxide. A regulating valve connected to a vacuum source is utilized to lower the pressure in the chamber thereby causing the barium peroxide to release oxygen and revert to its original barium oxide state. The released oxygen is then transmitted to a storage tank for later use.

BACKGROUND OF THE INVENTION

In the prior art, an apparatus is provided whereby barium oxide is placed in thin beds of iron retorts or heated by special furnaces to extract oxygen from barium oxide and barium peroxide. The temperature is maintained between 1200° F. and 1400° F., and air which has been previously freed from moisture and carbon dioxide by passing it first over quick lime and then over caustic soda, is forced by pumps through retorts whereby the barium oxide is converted into barium peroxide with the residual nitrogen being allowed to escape to the atmosphere. When the peroxidation is complete, a set of valves places the retorts in connection with an exhaust pump reducing the pressure causing liberation of the oxygen.

The oxidation of barium oxide to barium peroxide occurs under a high temperature and positive air pressure and flow and the subsequent reduction of barium peroxide to barium oxide occurs under a reduced pressure and temperature process. These retorts usually have the barium oxide placed in a tube containing a bed. The barium oxide is not a good heat conductor and is made a poorer one by being granular material so that the contact between particles is reduced. Under high air pressure conditions, the air conductivity helps the overall heating effect. Under vacuum conditions this contribution is substantially reduced. Moreover, the use of external insulation adds weight to the system and increases the start-up time of the system by absorbing thermal energy from the heater elements which would be directed to the granular crystals of barium oxide.

In another prior art apparatus an external electric heater, adjacent a densely packed column of barium oxide, is the thermal source which provides the operating temperature. The hottest part of this system is the heating elements and its surrounding parts. The next hottest part of the system would be the container wall with a temperature gradient established in the bed with the lowest temperature in the center. Since the activity in the bed increases with temperature and reaches a maximum near the melting point of the material, accurate heater control is desirable. Higher temperatures tend to fuse the material. If the material melts, there is a loss in activity due to the change and character of the bed. In the oxidation part of the cycle, the dense bed presents little difficulty since one can increase the air pressure across the bed and thus maintain a flow of air through it for oxidation. A channelizing effect can be encountered due to the variation of the packing density of the active material which leads to non-uniform oxidation of the bed. However, more serious difficulties are encountered in the evacuation part of the cycle due to the fact that a pressure drop is set up in the beds which can prevent the establishment of the low pressure required for efficient removal of the oxygen from the reversible reaction in the bed. The area of the bed that does not achieve sufficient low pressure does not experience a reversal of the chemical reaction and therefore does not contribute to the recovery of oxygen from the bed. The rate of reaction is also governed by the concentration of oxygen in the neighborhood of the particulate active material. If the oxygen concentration in the immediate neighborhood of the active material is reduced, the rate of recovery of oxygen from the barium peroxide can be increased. In this apparatus the frequency of the cycle is principally limited by the amount of time required to establish the low pressure or degree of vacuum required for the reduction of the barium peroxide to the barium oxide with the liberation and removal of oxygen.

SUMMARY OF THE INVENTION

Through my invention, I have provided an apparatus with an arrangement of active material whereby the required low pressure can be quickly established in the area of the barium peroxide so as to allow each of the particles to contribute to the overall production of oxygen in the system. In my arrangement the heating elements are dispersed throughout the active material so that as much heat as possible is directed toward the active material. This distribution of the heating elements throughout the active material allows a positive control of the start-up time of the apparatus. These heating elements are controlled individually or in small groups and therefore can give a uniform temperature distribution throughout the system.

In my apparatus, I have a chamber wherein a series of containers each has an individual heating element with a screen top and bottom for holding the granular barium oxide directly in contact with the heating elements. The heating elements are regulated in conjunction with a valve which supplies pressurized air to the chamber when the temperature of the barium oxide reaches 1200°–1400° F. The series of containers are placed on support members in such a manner as to direct the pressurized air to as much of the barium oxide as possible.

It is therefore an object of my invention to provide means for extracting oxygen from barium peroxide in a uniformly controlled system.

It is another object of my invention to provide an apparatus having a heating element which can be placed inside a container to operably control the production of the heat required for raising the temperature of the barium oxide sufficiently to react with pressurized air to form barium peroxide.

It is a still further object of my invention to provide means for directing pressurized air toward the barium oxide through a series of baffles so as to contact substantially all of the active material in the container.

These and other objects will become readily apparent to those skilled in the art from reading the specification and viewing the drawings.

BRIEF DESCRIPTION OF THE DRAWINGS OF THE PREFERRED EMBODIMENT

FIG. 1 is a sectional view of an apparatus containing a series of baffle type container members, each of which contains barium oxide and an individual heater element constructed in accordance with the principles of my invention;

FIG. 2 is a view taken along line 2—2 of FIG. 1;

FIG. 3 is a sectional view of a rectangular housing made in accordance with the principles of my invention;

FIG. 4 is a view taken along line 4—4 of FIG. 3; and

FIG. 5 is an end view of a plurality of cylindrical containers of the type shown in FIG. 1.

In the apparatus shown in FIG. 1, the housing 10 has an internal chamber 22 which is connected to an inlet port 12 and an outlet port 14. The inlet port 12 is connected to a regulating valve 16, which is a dual position valve, of a known type, which selectively communicates the inlet port 12 with a source of pressurized air (not shown) or with a source of vacuum 20. The outlet port 14 is similarly connected to a regulating valve 18, which is also a dual position valve which selectively communicates the outlet port with the atmosphere or with the vacuum source 20. The vacuum source 20 is also connected to an oxygen storage tank 21. Located inside the chamber 22 is a centrally located axial support member 26. The support member 26 is electrically insulated against the housing 10 by a non-conductive retainer member 23. Located radially around the support member 26 are a plurality of axial spaced support members 24 retained by non-conductive members 25. Located, respectively, on the axial supports 24 and 26 are a series of containers 27 and 28.

Each container 27 has a solid vertical wall 30 and horizontal surfaces 31 and 32 formed of a screen material, of the most open mesh that will retain the particle size of the granular barium oxide. The spacing of the active material containers 28 should be chosen with the primary regard for the provision of an adequate low conductance to low pressure flow so that the establishment of the required low pressure is limited more by the vacuum pump than by the conductance within the column. A heating element 46, which is connected to a source of electrical energy 33 (not shown) through voltage control 50, is located between the top screen member 32 and the bottom screen member 31 of the container. The screen members 31 and 32 retain the single layer of barium oxide crystals in direct contact with the heating element 46 while permitting the pressurized air to flow through and around each one of the particles of the barium oxide. Each container 28 is similarly formed.

The containers 27 and 28 which are located on the supports 24 and 26, respectively, are arranged to form a series of baffles for directing a portion of the pressurized air flowing in a serpentine path from the inlet port 12 to the outlet port 12 toward the granular barium oxide. This baffling arrangement permits the oxyen to be removed with minimum impedance during the vacuum cycle since the vacuum can be established uniformly through all of the particles of barium peroxide to an equal degree.

One of the electrical leads 29, for each of the series of containers 27 and 28, is hermetically sealed through the housing wall 10 to provide each individual heating unit with a separate circuit to the voltage control 50 while a common lead 34 is brought out through the end cap of the housing to complete the electrical circuit system. This system can be monitored and an automatic feedback control can maintain each heating element at a desired temperature in a manner well known in the art.

Heating elements 46 and 48 are located in the central position of containers 27 and 28, respectively. The heating elements 46 and 48 are each, a series of coils. When electrical energy is passed through the coils, heat will be produced and transferred to the barium oxide in a uniform manner. The containers 27 and 28 are alternately spaced on the support members. Container 28 is constructed in the form of a disc while container 27 is constructed in the form of a washer. This allows for good baffling while at the same time permitting the residual gas to flow unobstructed through the chamber 22 during the evacuation cycle.

MODE OF OPERATION OF THE PREFERRED EMBODIMENT

Upon demand by an operator, voltage control 50 is activated to permit the heating elements 46 and 48 to be energized by the source of electrical energy. When the barium oxide reaches a temperature of 1200° F. to 1400° F. the valve means 16 is opened to allow pressurized air to flow through the inlet port 12 along a serpentine path toward said outlet port 14. A portion of pressurized air is sequentially directed by containers 27 and 28 to the succeeding top and bottom screens. The pressurized air flows through inlet port 12 and comes into contact with the barium oxide where a reaction takes place. During this reaction the oxygen in the pressurized air which is flowing therethrough combines with the barium oxide to form barium peroxide. The barium peroxide is a very unstable type of material and must be maintained under a high temperature and pressure condition. The residue of gaseous material (mostly nitrogen) which is left from the pressurized air will flow out of the outlet port 14, past the valve member 18, and into the atmosphere. When the system has converted the barium oxide to barium peroxide, the pressurized air flow is stopped, the pressure is allowed to fall to atmospheric pressure by air flow out through outlet port 14 and valve 18 which is then closed when the pressure drops to the atmospheric level. Valves 16 and 18 are then both opened to the source of vacuum 20. The pressure within the chamber 22 is then lowered through suitable means, such as vacuum pumps, so that the barium peroxide will release oxygen and revert to barium oxide. The oxygen which is released in this reaction, will then be stored in a tank 21 for later use.

In the embodiment shown in FIG. 3, a plurality of support members 49 and 52 are located in a central position within the chamber 51. Both the support members 49 and 52 are electrically insulated from the housing 10 by non-conductive supports 53 and 55 and connected to a source of electrical energy 58 through voltage control 56. A series of rectangular containers 54 are spaced on supports 49 and 52 in a baffle arrangement to direct the flow of high pressure air through inlet port 60 toward the granular barium oxide retained in each rectangular container 54. A coil heating element 66 which is located within each container 54, engages the support members 49 and 52 to close the electrical circuit. Upon actuation by the operator, the control 56 activates the heating element 66 to raise the temperature of the barium oxide which is retained in the container by the screen members surrounding the heating element 66.

The operation of the oxygen producing apparatus, as shown in FIG. 3 is exactly the same as the mode of operation of the circular type of containers shown in FIG. 1.

I have found that the efficiency of the design can be improved by increasing the diameter or the overall size of the container rather than by increasing the length of it. This appears to be caused by the fact that the conductance is kept large which is important during the evacuation part of the cycle.

The oxygen produced by this method is usually from 97% to 98% pure. While the apparatus for extracting oxygen from barium oxide has been described with reference to a single unit, it is possible to have a bank of several of these apparatus retained in a housing 70 as shown in FIG. 5 in order to produce sufficient oxygen to receive air in a large breathing apparatus such as a submarine or in an airplane. When several of these banks are used, it may be beneficial to provide exterior temperature insulation around the outside of the container 10 thus allowing the temperature to remain internally instead of being passed off to the outside of the chamber. Thus, it is possible for the chamber to remain at a relatively high temperature during the time required to release the oxygen and begin the flow of pressurized air through the inlet port 12 signaling the start of a new cycle.

I claim:

1. An apparatus for extracting oxygen from air comprising:
   wall means joined together to form a housing with a chamber therein, said chamber having an inlet port and an outlet port;
   support means located in said chamber;
   a source of electrical energy;
   a series of first container means located on said support means, each of said first container means having a first heating element electrically connected to said source of electrical energy, each of said first container means having a top screen and a bottom screen for retaining granular barium oxide in direct contact with said first heating element;
   a series of second container means alternately located on said support means with respect to said first container means, each of said second container means having a second heating element electrically connected to said source of electrical energy, each of said second container means having a top screen and a bottom screen for retaining granular barium oxide in direct contact with said second heating element, said first and second container means being located on said support means to provide an unobstructed serpentine path between said inlet and outlet ports;
   regulating means for controlling the flow of a source of pressurized air through said chamber along said serpentine path when said first and second heating elements raise the temperature of the barium oxide crystals to a predetermined temperature, said first and second container means directing pressurized air flowing in said sepentine path toward and through said top and bottom screens where said pressurized air reacts with said granular barium oxide to form barium peroxide; and
   vacuum means connected to said inlet and outlet ports sequentially operating with said regulating means for uniformly reducing the pressure in said chamber causing the granular barium peroxide to rapidly release oxygen and return to granular barium oxide.

2. In the apparatus, as recited in claim 1, wherein said support means includes:
   a rod electrically insulated from said housing while being electrically connected to said source of electrical energy with said housing.

3. In the apparatus, as recited in claim 2 further including:
   electrical control means connected to each of said first and second heater elements for maintaining a uniform temperature throughout said chamber.

4. In the apparatus, as recited in claim 1, wherein said support means includes:
   a first rod electrically insulated from said housing; and
   a second rod electrically insulated from said housing, said first rod and said second rod being electrically connected to said source of electrical energy.

5. In the apparatus, as recited in claim 4 wherein said first and second container means includes:
   a rectangular frame separating said top screen from said bottom screen, said rectangular frames alternately extending from opposite walls of the chamber past the center of the chamber to form said serpentine path.

6. In the apparatus as recited in claim 5, wherein said heating element includes:
   a plurality of coils centrally contained in and insulated from said frame being electrically connected to said source of electrical energy, said top screen and said bottom screen retaining said granular barium oxide in contact with said coils.

7. In the apparatus as recited in claim 5 wherein each of said first and second heating elements include:
   a plurality of coils located between and insulated from said rectangular frame, each of said coils having one end connected to the first rod and the other end connected to the second rod, said top and bottom screens retaining the granular barium oxide in contact with said coils.

8. In the apparatus, as recited in claim 1, wherein said support means includes:
   a first rod electrically insulated from said housing located along the central axis of said chamber; and
   a plurality of rods surrounding said first rod electrically insulated from said housing.

9. An apparatus for extracting oxygen from air, comprising:
   a housing having a chamber therein with an inlet port and an outlet port;
   a support member located in said chamber;
   a source of electrical energy operatively connected to said support and said housing;
   a series of containers positioned in a baffle arrangement on said support member, each of said containers having a heating element closing an electrical energy path between said support and said housing, each of said containers having a top and bottom screen cover for retaining granular barium oxide in direct contact with said heating element;
   regulating means for permitting pressurized air to be transmitted through said inlet port into said chamber, said baffle arrangement directing said pressurized air through said screen covers to said barium oxide when said heating element raises the temperature of said granular barium oxide to a predetermined value thereby allowing barium peroxide to form while removing the resulting gaseous residue through said outlet port; and
   vacuum means connected to said inlet port and said outlet port to operate in sequence with said regulating means for uniformly reducing the pressure in said housing causing said barium peroxide to rapidly release oxygen and return to barium oxide, said oxygen upon release being transmitted to a storage tank.

References Cited
UNITED STATES PATENTS

| | | | |
|---|---|---|---|
| 432,815 | 7/1890 | Brin | 23—221 |
| 1,956,573 | 5/1934 | Haslam | 23—288 J UX |
| 1,184,480 | 5/1916 | Moore | 23—288 J UX |
| 1,193,798 | 8/1916 | Landis | 23—288 J |
| 3,497,674 | 2/1970 | Zirngibl et al. | 23—252 UX |
| 2,642,340 | 6/1953 | Martin | 23—281 X |

JOSEPH SCOVRONEK, Assistant Examiner

U.S. Cl. X.R.

23—221; 219—365, 374